United States Patent
Brockhaus et al.

(10) Patent No.: US 10,511,587 B2
(45) Date of Patent: Dec. 17, 2019

(54) AUTHORIZATION APPARATUS AND METHOD FOR AN AUTHORIZED ISSUING OF AN AUTHENTICATION TOKEN FOR A DEVICE

(71) Applicant: SIEMENS AKTIENGESELLSCHAFT, München (DE)

(72) Inventors: Hendrik Brockhaus, Unterbiberg (DE); Steffen Fries, Baldham (DE); Michael Munzert, Gräfelfing (DE); David Von Oheimb, Heimstetten (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/579,364

(22) PCT Filed: May 18, 2016

(86) PCT No.: PCT/EP2016/061073
§ 371 (c)(1),
(2) Date: Dec. 4, 2017

(87) PCT Pub. No.: WO2016/198241
PCT Pub. Date: Dec. 15, 2016

(65) Prior Publication Data
US 2018/0359241 A1 Dec. 13, 2018

(30) Foreign Application Priority Data
Jun. 11, 2015 (DE) .................. 10 2015 210 718

(51) Int. Cl.
*H04L 29/06* (2006.01)

(52) U.S. Cl.
CPC ........ *H04L 63/0807* (2013.01); *H04L 63/062* (2013.01); *H04L 63/0823* (2013.01); *H04L 63/123* (2013.01)

(58) Field of Classification Search
CPC ............... H04L 63/0807; H04L 63/062; H04L 63/0823; H04L 63/123
(Continued)

(56) References Cited

U.S. PATENT DOCUMENTS 7,565,554 B2 * 7/2009 Joosten ................... G06F 21/33
380/278
7,711,957 B2 * 5/2010 Brockhaus .............. G06F 21/10
713/172
(Continued)

FOREIGN PATENT DOCUMENTS

| DE | 60218042 T2 | 11/2007 |
| DE | 102009036179 A1 | 2/2011 |
(Continued)

OTHER PUBLICATIONS

PCT International Search Report and Written Opinion of International Searching Authority dated Jul. 13, 2016 corresponding to PCT International Application No. PCT/EP2016/061073 filed May 18, 2016.

*Primary Examiner* — Taghi T Arani
*Assistant Examiner* — Badri Champakesan
(74) *Attorney, Agent, or Firm* — Schmeiser, Olsen & Watts LLP

(57) ABSTRACT

Provided is a method for an authorized issuing of an authentication token for a device, including requesting an authentication token for the device by sending a request message and at least one authentication parameter to an authorization apparatus, verifying authenticity of the request message using the authentication parameter, verifying authorization for the request by comparing information on
(Continued)

the device obtained with the request message in the authorization apparatus with context information for the device stored in a database, and on success of the verification of the authenticity and of the authorization, authorizing the issuing of the requested authentication token.

10 Claims, 2 Drawing Sheets

(58) Field of Classification Search
 USPC .......................................................... 726/4
 See application file for complete search history.

(56) References Cited

U.S. PATENT DOCUMENTS

| | | | | |
|---|---|---|---|---|
| 7,721,100 | B2* | 5/2010 | Brockhaus | G06F 21/10 713/172 |
| 7,797,532 | B2* | 9/2010 | Miura | G06F 21/445 713/156 |
| 8,688,976 | B2* | 4/2014 | Busser | G06F 21/57 380/278 |
| 8,775,796 | B2* | 7/2014 | Karasawa | G06F 21/33 713/156 |
| 9,003,190 | B2* | 4/2015 | Busser | H04L 9/08 713/168 |
| 9,094,212 | B2* | 7/2015 | Thomas | H04L 9/3234 |
| 9,281,949 | B2* | 3/2016 | Nair | H04L 63/0823 |
| 9,485,255 | B1* | 11/2016 | Avital | H04L 63/10 |
| 2004/0221045 | A1* | 11/2004 | Joosten | G06F 21/33 709/227 |
| 2005/0065799 | A1* | 3/2005 | Dare | G06F 21/6245 705/50 |
| 2008/0126794 | A1* | 5/2008 | Wang | H04L 63/0464 713/151 |
| 2010/0191967 | A1* | 7/2010 | Fujii | G06F 21/32 713/169 |
| 2011/0185171 | A1* | 7/2011 | Karasawa | G06F 21/33 713/156 |
| 2012/0137129 | A1* | 5/2012 | Busser | G06F 21/57 713/156 |
| 2015/0046697 | A1* | 2/2015 | Galpin | H04L 63/0884 713/155 |
| 2015/0143472 | A1* | 5/2015 | Kim | H04W 48/02 726/4 |
| 2015/0281225 | A1* | 10/2015 | Schoen | H04L 63/06 726/9 |
| 2016/0050198 | A1* | 2/2016 | Thibadeau, Sr. | H04L 63/0807 726/6 |
| 2016/0255067 | A1* | 9/2016 | Keromytis | H04L 63/0807 726/7 |
| 2016/0323269 | A1* | 11/2016 | Zaheer | H04L 63/0846 |

FOREIGN PATENT DOCUMENTS

| | | |
|---|---|---|
| EP | 2120392 A1 | 11/2009 |
| WO | WO 2013045874 A1 | 4/2013 |

* cited by examiner

AUTHORIZATION APPARATUS AND METHOD FOR AN AUTHORIZED ISSUING OF AN AUTHENTICATION TOKEN FOR A DEVICE

CROSS-REFERENCE TO RELATED APPLICATIONS

This application claims priority to PCT Application No. PCT/EP2016/061073, having a filing date of May 18, 2016, based on German Application No. 10 2015 210 718.3, having a filing date of Jun. 11, 2015, the entire contents both of which are hereby incorporated by reference.

FIELD OF TECHNOLOGY

The following is related to an authorization apparatus and a method for authorized issuing of an authentication token for a device, which is, e.g., part of an automation system.

BACKGROUND

Today's industrial systems comprise of various kinds of devices interconnected by a data network and transferring data among them. Such industrial control systems or SCADA (Supervisory Control and Data Acquisition) Systems increasingly communicate via open protocols such as IP (Internet Protocol), TCP (Transmission Control Protocol), UDP (User Datagram Protocol), HTTP (Hypertext Transfer Protocol) and CoAP (Constrained Application Protocol). In case additional security protocols have to be used, these security protocols typically apply cryptography, making use of authentication tokens such as, e.g., certificates with respective public and private keys, or passwords, etc.

In order to obtain such an authentication token, e.g., a certificate, a device has to prove its identity. This can be achieved by using a previously established authentication parameter, typically a one-time password or a private key, installed, e.g., during production process or during assembly, or during the earlier establishment of an authentication token for the device or a component of it.

An authentication token contains or references the authentication parameter as well as identity information about the device and/or its component, e.g., the device serial number and/or component name, and possibly further information like its validity period and digital signature by the issuing entity.

Hardware, software, people, policies and procedures are specified for a so-called Public Key Infrastructure (PKI) to create, manage, distribute, use, store, and revoke digital certificates and manage public-key encryption. To assign an authentication token to a device, e.g., after installation to an industrial control system in a public key infrastructure, the device sends an authentication token request, which is typically a certificate signing request, message to a registration authority trusted by the certification authority or directly to the certification authority. The registration authority usually verifies the identity of the device, e.g., manually by an administrator or by verifying the authentication parameter, which may be a one-time password sent by the device or signature related to a pre-existing certificate issued and signed by a trusted certification authority. The pre-existing certificate includes information about the device itself and/or one of its components, e.g., a device ID such as a serial number and/or component ID, a validity period of the certificate, and a public key that may be used to verify the request signature. On success of the device authentication, the registration authority will accept this request message and pass it further to a certificate authority, which issues an authentication token.

In order to enhance the security of industrial system applications, authentication tokens of dedicated devices or one of its components shall only be provided in a certain environment, e.g., at dedicated sections of a control system. The provision of device's authentication tokens shall also be restricted in time, e.g., communication to registration and certification authorities shall only be possible during a given time period. This should also help to prevent a device or its software components from being usable outside of the intended control system, e.g., to prevent misuse of the device, e.g., after theft.

SUMMARY

An aspect relates to a method and means to control and limit the issuance of the device's authentication token(s) to dedicated locations, organizational domains, periods of time, and applications.

The following relates to a method and an authorization apparatus for an authorized issuing of an authentication token for a device based on context information.

In accordance with one embodiment of the invention, a method for an authorized issuing of an authentication token for a device, comprises the steps of
  requesting an authentication token for the device by sending a request message and at least one authentication parameter to an authorization apparatus,
  verifying authenticity of the request message using the authentication parameter,
  verifying authorization for the request by comparing information on the device obtained with the request message in the authorization apparatus with context information for the device stored in a database, and
  on success of the verification of the authenticity and of the authorization, authorizing the issuing of the requested authentication token.

Comparing information on the device with context information for the device provides the possibility to check further conditions which have to be fulfilled before accepting the request message at the authorization apparatus. By verifying the at least one authentication parameter provided with the request message it is assured that the message is actually sent by the device it pretends to be. Only if both verifications provide a positive result the requested authentication token will be issued either by the authorization apparatus itself or, e.g., by a certification authority which is informed by the authorization apparatus to issue the requested authentication token. With these measures, e.g., an automatic enrollment of devices can be restricted to specific areas or domains of the system or to specific time intervals and circumstances, such as service procedures. E.g., devices, such as service terminals can only get access to the automation system at pre-defined time intervals. This implies also, that hackers attacking an automatic enrollment process can be repelled with high probability, as they would have to fulfill all conditions implied by the context information. The least one authentication parameter can be provided from the device together with the request message or it can be provided by another party, e.g., a service person sending a password as an authentication parameter to prove authentication of the device.

In an embodiment of the method, the information on the device (20) obtained with the request message (CSReq) and used for verifying the authorization of the request message is at least one of further information included in the request message, information generated in the authorization apparatus during receipt of the request message or information on the device sent by another party to the authorization apparatus.

Further information which is received as a part of the request message may be information indicating the domain of an automation system, the device has to be installed in. Information generated in the authorization apparatus during receipt of the request message can be the time the request message is received in the authorization apparatus. Information on the device sent by another party can be information sent by a service personal or an installation server. Therefore various conditions can be set for issuing an authentication token.

In accordance with another embodiment of the method at least one authentication parameter is generated depending on a private key related to a pre-installed device-specific digital certificate.

Device-specific digital certificates are usually issued during installation or manufacturing of a device and are therefore already available in a device. Therefore no additional measures need to be taken to provide a device-specific authentication parameter. A device-specific digital certificate usually provides a subject it is issued for, here, e.g., a serial number of the device, a public key and a digital signature. Typical further information may be included as specified in the standard X.509. The authentication parameter may be, e.g., a digital signature generated by applying the private key. A public key uniquely relating to the private key is included in a pre-existing device-specific certificate, and is known in the authorization apparatus. The authentication is positively verified, when the apparatus verifies the digital signature of the request message applying the public key of device.

In a further embodiment of the method the authentication token is a digital certificate.

This means that the device receives a digital certificate after authorization of the issuing of an authentication token. The digital certificate is usually used during setup of a session with a communication partner to identify and authenticate the device to the communication partner. The digital certificate therefore allows communication of the device with arbitrary communication partners.

In a further embodiment of the method context information for the device stored in a database is at least one of identification information, organizational information, location information, time related information, application information, and status information on the device and/or its components.

This allows a variety of conditions that can be checked. E.g., identification information can be an IP address or a range of IP addresses. Here the IP address of the data package the request message is transmitted in identifying the device or its component in a lower layer of the transmission protocol stack can be compared with a pre-defined IP address or IP address range stored in the database. Organizational information can be, e.g., a production unit or a customer the device is assigned to. Location information can be the geographical location of the device when sending the request message. Time related information which is, e.g., a time interval in which the issuing of a certificate is allowed. Application information could distinguish the provision of tokens for different tasks such as service applications or for maintenance applications. Status information can identify a device or its component being, e.g., "in operation", "in maintenance" state, if, e.g., a respective authentication token is issued. Status information can express a device or its component being, e.g., "in preparation", "in use", "out of order", "replaced" or "stolen".

Information on the device obtained with the request message and used for verifying the authorization of the request message in the authorization apparatus can be the same type of information as the context information described above.

In a further embodiment of the method at least part of the context information for the device stored in a pre-defined database is updated when the authentication token is issued.

This allows tracking and monitoring of the status of a device or its component.

In a further embodiment of the method at least part of the context information for the devices stored in the pre-defined database can be updated in a secure way by a third party.

This allows to change the context information, e.g., by a maintenance personal, by a supervising controller or other trusted third parties. A third party can be human personal or a control device. The access is provided in a secure way, e.g., by cryptographic mechanisms used for authentication of the third party and for integrity checks for transmitted data.

In accordance to a second embodiment of the invention an authorization apparatus is provided for an authorized issuing of an authentication token for a device. The apparatus comprises a storage unit configured to provide a database including context information for the device, an interface unit configured to receive a request message and at least one authentication parameter of the device, a first verification unit configured to verify the authenticity of the request message using the authentication parameter, a second verification unit configured to verify authorization of the request by comparing information on the device obtained with the request message with context information for the device stored in a database, and an authorization unit configured to authorize the issuing of the requested authentication token, if the first and the second verification unit indicated a positive result.

The authorization apparatus verifies not only the device as such, but also further preconditions which are set by context information in a pre-defined database. The authorization apparatus therefore accepts and forwards a request message only if the preconditions implied by contents of the pre-defined database are fulfilled. This allows preventing the usage or application of a device if pre-defined conditions are not met.

In a further embodiment of the inventive apparatus the storage unit is configured to be updated when the authentication token is issued.

This allows to monitor and track, e.g., the status of the device, e.g., in different applications. The pre-defined database indicates, e.g., when an authentication token was issued or authorized and/or for which application the token was issued.

In a further embodiment the inventive apparatus comprises an additional interface configured to provide secure access to the storage unit for a third party to update the pre-defined database.

The additional interface may be configured to provide security protocols like the transport layer security protocol (TLS) which provides authorization and integrity checks for the data provided over this interface.

In an additional embodiment the inventive apparatus comprises an issuing unit configured to issue the requested authentication token for the device.

In this case the authorization apparatus not only authorizes the issuing of the authentication token but also issues an authentication token. This complies with a combined registration and certification authority as known from a Public Key Infrastructure PM.

In an additional embodiment of the invention is a computer program with programmable-code-means, which performs all method steps described above, when the program is performed on a programmable computer and/or a digital signal processor.

An additional embodiment of the invention provides a digital storage medium with electronically readable control signals, which interact with a programmable computer and/or digital signal processor in a manner that all steps of the described method can be performed.

BRIEF DESCRIPTION

Some of the embodiments will be described in detail, with references to the following figures, wherein like designations denote like members, wherein.

In the drawings like reference characters generally refer to the same parts throughout the different views and figures.

DETAILED DESCRIPTION

Figure 1:
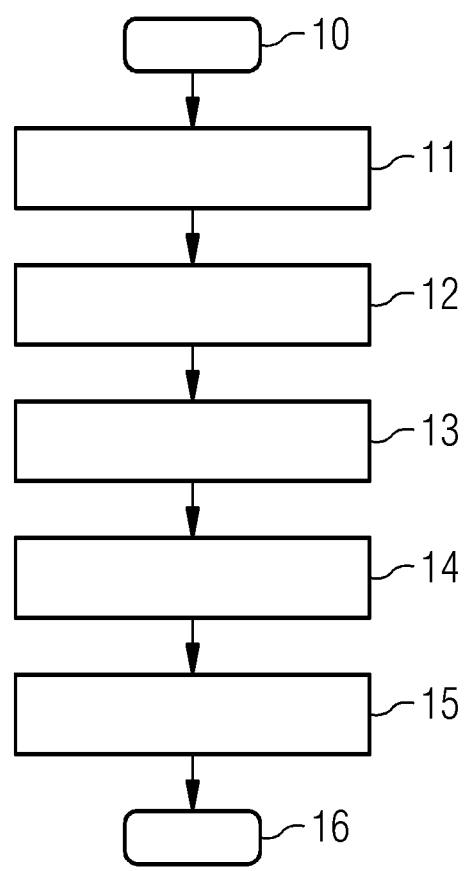
FIG. 1 is a flow chart of an embodiment of the method.

FIG. 1 shows a flow chart of an embodiment of the inventive method. The method may be applied by a device which is, e.g., a field device of an industrial automation system or a controller of a power generation system, e.g., with SCADA functionality. The devices communicate, e.g., via open protocols such as IP, TCP, UDP, http and CoAP. To secure this communication additional security protocols are used like, e.g., transport layer security (TLS) or further automation system-specific security protocols which typically apply asymmetric cryptographic functions using private and public key.

In the initial state 10 the device obtains or generates a device specific initial authentication parameter, e.g., a one-time password or private key related to a device public key, which was implemented during manufacturing or assembly or configuration of the device. It is already available when the device is deployed into a system, where the various devices communicate with each other via a communication network.

In step 11, which may be repeated any number of times, the device may derive from its already existing authentication parameter(s) any number of further authentication parameters, which may be specific for the device or for any component of it. For any of these authentication parameters, the device may obtain, by any secure means, a related authentication token, e.g. a digital certificate. As mentioned before, this token includes identity information, e.g., the serial number of the device and/or a component ID, the authentication parameter or a reference to it, and optionally further information like the validity period and digital signature by the issuing entity.

In step 12 the device requests an initial, updated, or additional authentication token by sending a request message making use of any valid authentication parameter(s) and possibly including the related authentication token(s) and/or other information on the device to an authorization apparatus.

At the authorization apparatus in a first verification step 13 the identity of the device and the authenticity of its request is verified by checking the provided authentication parameter(s) and possibly the related authentication token(s).

In a second verification step 14, information on the device is compared with context information for the device stored in a pre-defined database. The pre-defined database is accessible by the authorization apparatus. The pre-defined database can be included in the authorization apparatus or it can be located in an external server or storage unit. On success of both verification steps the request message is accepted, which means that the issuing of the requested authentication token is authorized, see step 15. If the request message is authorized in step 15 an authentication token is issued, e.g., by a Certification Authority and send back to the device. The method such ends in state 16.

Figure 2:
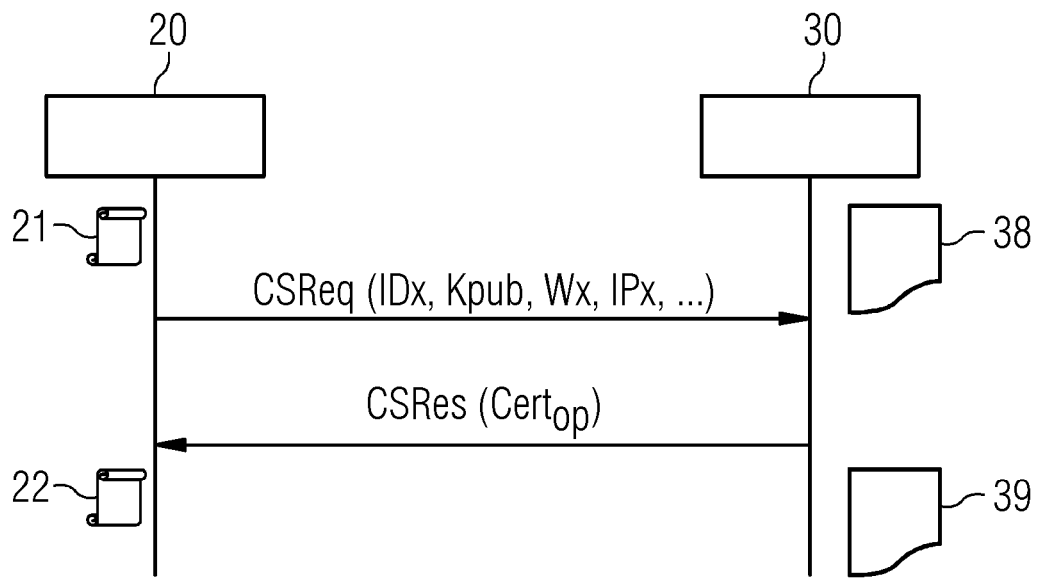
FIG. 2 shows a message flow of an embodiment of the method between a device and an authorization apparatus.

In FIG. 2 an according message flow is shown between a device 20 and an authorization apparatus 30 for the typical case of requesting a new authentication token, i.e. a new digital certificate. The device 20 contains an authentication parameter, e.g., in form of a private key related to a component certificate 21 including identifier of the device and/or its component, such as a serial number IDxn, as well as device-specific public key and typically a digital signature of an issuing authority for this component certificate. The authorization apparatus 30 comprises a pre-defined database 38 including context information for the device 20.

The device 20 requests to issue a new authentication token, here a certificate $Cert_{op}$, for the device to be used afterwards in communication with communication partners in the system. Therefore the device sends a request message CSReq including the public key Kpub for which the certificate shall be issued and further information like an identifier IDxn, e.g., the serial number of the device, which can be part of the component certificate. Further information like the IP address IPxn of the device or component can be part of the request message CSReq. Optionally further information like information about the domain in which the device is installed Wx can be provided with a request message CSReq. The request message further comprises a digital signature generated using any authentication parameter established before, e.g., the private key related to the device certificate, and optionally also the device certificate itself.

On receipt of the request message CSReq in the authorization apparatus 30, the device identity and the authenticity and integrity of the request message is checked by the provided digital signature, see step 13 in FIG. 1. As a second step 14 now also the authorization for requesting the authentication token is checked by comparing information on the device and possibly further information, like the reception time, with context information for the device stored in the pre-defined database 38. The pre-defined database 38 has to be provided beforehand, e.g., by commissioning information for an automation system or domain of the system. In the preparation phase an assembly agent sends a list with device identifiers IDxn that shall be installed, e.g., in a windpark X to a central administration. At the central administration the pre-defined database 38 is generated. The pre-defined database 38 now includes all device-identifiers IDxn as well as additional information, e.g., about a range of IP addresses IPx1 to IPxn assigned to the devices to be installed in windpark X. Further information assigned to the device id IDnx and stored in the pre-defined database 38 may be a time period in which the devices are allowed to request a token, or information about components of the devices allowed to request authentication tokens. Further information on the devices is, e.g., status information with respect to the devices or authenticity token assignments for the device.

Only if also the second verification 14 is successful the authorization apparatus 30 authorizes the request message CSReq to be accepted and to be forwarded to an issuing authority for issuing the requested certificate $Cert_{op}$. In FIG. 2 it is assumed that the shown authorization apparatus 30 includes also a certification authority. It is also possible that the authorization apparatus 30 transfers the request message to a separate component which issues the requested certificate.

As result a certificate response message CSRes is sent back to the device 20 including the requested authentication token, in this case the certificate. This authentication token is now used and stored as certificate 22 in the device 20.

The authorization apparatus 30 usually notifies the authorization of the request message CSReq or the issuing of the token by updating the pre-defined database, e.g., by changing status information. This results in an updated database 39. The updated database 39 may include further changed parameters. In this modified database 39, e.g., the status of the device is now changed from "no token" to "token issued". Also more dedicated information can be included, e.g., the IP address assigned to the device, which should be one of the IP addresses from the pre-defined IP address range for the devices.

Also information about applications or use cases, like "maintenance" or "normal operation" can be included in the database. E.g., a use case can be set to "in maintenance" or the status can be "disabled" when the device is taken out of service.

Figure 3:
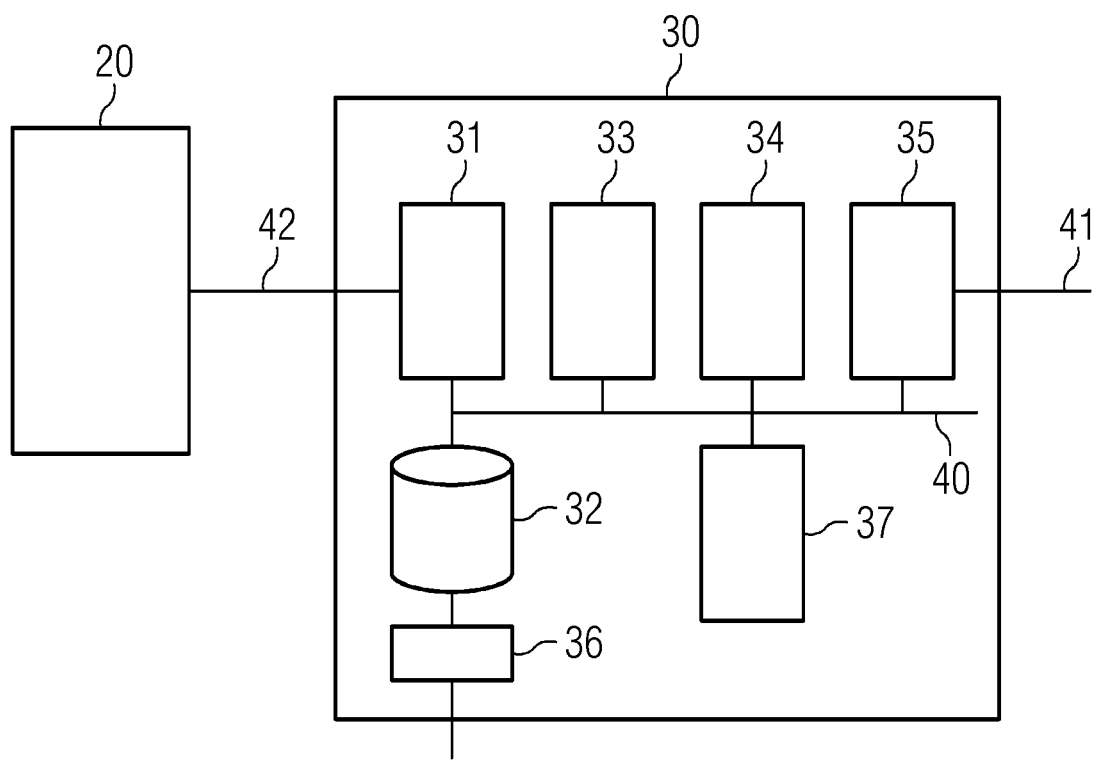
FIG. 3 shows a block diagram of an embodiment of an authorization apparatus.

FIG. 3 shows an authorization apparatus 30 connected by any kind of wired or wireless communication network 42 with device 20. The authorization apparatus 30 comprises an interface unit 31 providing an interface to the device 20. The authorization apparatus 30 further comprises storage units 32 configured to provide the database 38, 39. The authorization apparatus 30 further comprises a first verification unit 31 which is configured to verify that the device and its request message is authentic. A second verification unit 34 is configured to check its authorization by comparing information on the device and possibly further information with context information for the device stored in the database 38, 39.

The authorization apparatus 30 also comprises an authorization unit 35 configured to authorize the issuing of the requested authentication token, if both the first and the second verification unit indicate a positive result. The authorization can be performed by transferring the request message via an external connection 41 to an external entity issuing the token and sending it to the device 20. The authorization apparatus 30 can also contain an issuing unit 37 which issues the requested authentication token. Here the authentication token is transmitted from the authorization apparatus 30 to the device 20.

The authorization apparatus 30 can also comprise an additional interface 36 configured to provide secure access to the storage unit 32 for trusted third parties. Via this interface 36 a third party, like operational personnel or monitoring or supervising controllers, can access the storage unit 32 to provide a pre-defined database or to modify the database or delete it. The interface may support cryptographic algorithms to perform authentication of the accessing third party and to provide measures to guarantee integrity of the transferred data. The storage unit 32 and especially the database 32 can also be accessed and changed after a request message is authorized and the database 38 is updated according the result of the verification, see database 39 in FIG. 2.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for an authorized issuing of an authentication token for a network connected device, comprising:
    requesting the authentication token for the network connected device by sending a request message and at least one authentication parameter to an authorization apparatus;
    verifying authenticity of the request message using the at least one authentication parameter, wherein the authentication parameter is generated based on a private key related to a pre-installed device-specific digital certificate;
    verifying authorization for the request message by comparing information on the network connected device obtained with the request message in the authorization apparatus with context information for the device stored in a database, wherein the context information is at least one of: identification information, organizational information, location information, time related information, application information, or status information of the device;
    and authorizing to issue the requested authentication token only upon successfully verifying both the authenticity of the request message and the authorization for the request message, wherein the requested authentication token is a new digital certificate.

2. The method according to claim 1, wherein at least part of the context information for the device stored in the database is updated when the authentication token is issued.

3. The method according to claim 1, wherein the context information for the device stored in the database is updated in a secure way by a third party.

4. The method according to claim 1, wherein the information on the device obtained with the request message and used for verifying the authorization of the request message is at least one of: further information included in the request message, information generated in the authorization apparatus during receipt of the request message, or information on the device sent by another party to the authorization apparatus.

5. An authorization apparatus for an authorized issuing of an authentication token for a network connected device, comprising a hardware processor configured to: provide a database including context information for the network connected device;
    receive a request message and at least one authentication parameter of the network connected device, wherein the authentication parameter is generated based on a private key related to a pre-installed device-specific digital certificate;
    verify the authenticity of the request message using the at least one authentication parameter;

verifying authorization for the request message by comparing information on the network connected device obtained with the request message and at least a context information in the authorization apparatus, wherein the context information for the device stored in the database is at least one of: identification information, organizational information, location information, time related information, application information, or status information of the device;

and authorize to issue the requested authentication token, only upon successfully verifying both the authenticity of the request message and the authorization for the request message, wherein the requested authentication token is a new digital certificate.

6. An apparatus according to claim 5, wherein the database is configured to be updated when the authentication token is issued.

7. The apparatus according to claim 5, further configured to provide secure access to the database for a third party to update the database.

8. The apparatus according to claim 5, further configured to issue the requested authentication token for the device.

9. A computer program product, comprising a non-transitory computer readable hardware storage network connected device storing a computer readable program code, the computer readable program code comprising an algorithm that when executed by one or more processors of a computer system implements a method, the method comprising:

requesting an authentication token for the network connected device by sending a request message and at least one authentication parameter to an authorization apparatus, wherein the authentication parameter is generated based on a private key related to a pre-installed device-specific digital certificate;

verifying authenticity of the request message using the at least one authentication parameter;

verifying authorization for the request message by comparing information on the network connected device obtained with the request message and at least a context information in the authorization apparatus, wherein the context information for the network connected device stored in a database is at least one of: identification information, organizational information, location information, time related information, application information, or status information of the device;

and authorizing to issue the requested authentication token, only upon successfully verifying both the authenticity of the request message and the authorization for the request message, wherein the requested authentication token is a new digital certificate.

10. A computer system, comprising: one or more processors; one or more memory devices coupled to the one or more processors; and one or more computer readable storage devices coupled to the one or more processors, wherein the one or more storage devices contain program code executable by the one or more processors via the one or more memory devices to implement a method, the method comprising:

requesting an authentication token for the network connected device by sending a request message and at least one authentication parameter to an authorization apparatus, wherein the authentication parameter is generated based on a private key related to a pre-installed device-specific digital certificate;

verifying authenticity of the request message using the at least one authentication parameter;

verifying authorization for the request message by comparing information on the network connected device obtained with the request message and at least a context information in the authorization apparatus, wherein the context information for the network connected device stored in a database is at least one of: identification information, organizational information, location information, time related information, application information or status information of the device;

and authorizing to issue the requested authentication token, only upon successfully verifying both the authenticity of the request message and the authorization for the request message, wherein the requested authentication token is a new digital certificate.

* * * * *